Patented May 8, 1951

2,552,328

UNITED STATES PATENT OFFICE 2,552,328

MONO-ENOLIC ORGANIC COMPOUNDS USED TO MODIFY PHYSICAL PROPERTIES OF THERMOPLASTIC POLYMERS

Edward L. Kropa, Old Greenwich, Conn., assignor to American Cyanamid Company, New York, N. Y., a corporation of Maine No Drawing. Application July 25, 1947, Serial No. 763,764

1 Claim. (Cl. 260—89.5)

This invention relates to thermoplastic polymeric materials and more particularly, to a process for modifying the physical properties of thermoplastic polymeric materials.

Thermoplastic polymers and, in fact, almost any particular type of resin possess, for a given use or application, certain properties which are advantageous and certain other properties which are disadvantageous. Thus, a set of certain so-called advantageous properties might make a resin suitable for an application wherein the corresponding set of so-called disadvantageous properties is immaterial. On the other hand, however, in many cases the disadvantageous properties will interfere with the benefits desired from the advantageous properties.

To take a specific example, polystyrene may be considered. Polystyrene has good electrical properties and therefore should be extremely useful in the manufacture of molded articles for use in electrical equipment. Moreover, polystyrene is transparent, readily colored, relatively strong and easily molded and it should therefore find wide use in the manufacture of various novelties and household articles. However, polystyrene has relatively poor heat resistance and as a result of this property its application in the fields just mentioned has necessarily been somewhat limited. For example, in many electrical applications of molded plastics there is a possibility of exposure to relatively high temperatures as a result of heat generated in resistance coils and heat generated by electronic tubes, batteries, etc. Similarly, household articles of molded polystyrene are necessarily often exposed to temperatures at least as high as boiling water. Unfortunately, if articles molded of polystyrene are subjected to even moderately high temperatures they become distorted either because of internal strains if they have been injection molded or as a result of subjection to any load while at an elevated temperature.

As described in the copending application of Murray G. Sturrock and Thomas Lawe, Serial No. 563,453, filed November 14, 1944, now abandoned, it has been found that polymers of dimethyl styrenes have improved heat resistance over that of polystyrene itself. They are therefore suitable for use in electrical equipment or in the manufacture of household articles for which polystyrene itself has not been entirely satisfactory.

According to the present invention I have discovered a process according to which styrene, monoalkyl substituted styrenes and monohalogen substituted styrenes may be polymerized to produce a polymeric material of modified physical properties and particularly, a polymeric styrene of improved heat resistance comparable to the polymerized dimethyl styrenes.

Another specific example of thermoplastic polymeric materials to which the present invention may be applied consists of the polyacrylates, i. e., polymerized acrylic and alkacrylic acids, esters thereof, acrylonitrile, acrylamide, etc. Polyacrylates tend to be rubbery products and hence cannot be used satisfactorily in certain applications for which this property makes them unsuited. A polyacrylate of improved "toughness" and increased tensile strength may, however, be prepared according to my invention.

According to the present invention, therefore, I have discovered that when certain vinyl compounds are polymerized in accordance therewith the very nature of the polymer itself is changed and greatly increased molecular weights with consequent improved mechanical properties are obtained.

It is an object, therefore, of the present invention to provide a process for modifying the physical properties of thermoplastic polymers such as polystyrenes, polyacrylates, etc.

Another object of the present invention is to provide an improved process for the polymerization of monomeric compounds containing a single polymerizable $CH_2=C<$ group to produce polymeric materials soluble in organic solvents.

A further object of the present invention is to bring about polymerization of a monomeric substance containing a single polymerizable $CH_2=C<$ group under such conditions that physical properties other than solubility in organic solvents of the resulting polymer are modified.

The above and other objects are attained by polymerizing at least one monomeric substance containing a single polymerizable $CH_2=C<$ group in a non-acidic aqueous medium in the presence of a peroxide polymerization catalyst and in the presence of an organic compound containing a single grouping

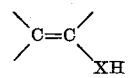

where X is O or S, said compound being stable in neutral and alkaline media.

The invention will be described in greater detail in conjunction with the following specific examples in which proportions are given in parts by weight unless otherwise indicated.

Example 1

75 parts of styrene (steam distilled from a 2% sodium hydroxide solution)
0.375 part of polyvinyl alcohol (type A, high viscosity, No. R. H. 490)
0.15 part of benzoyl peroxide
0.0225 part of beta-naphthol
730 parts of distilled water The polyvinyl alcohol is dissolved in the water by stirring at room temperature for about 15 minutes followed by heating on a steam bath. The solution is then filtered and introduced into a vessel equipped with a reflux condenser, a thermometer and agitating means. An atmosphere of carbon dioxide is provided by introduction of gas through the top of the condenser.

The benzoyl peroxide is dissolved in the styrene at room temperature, the resulting solution is filtered, and the filtered solution is introduced into the vessel containing the solution of polyvinyl alcohol. The beta-naphthol is then added.

The reaction mixture is heated with stirring at 85° C. for 24 hours and then steamed to recover the very small amount of unpolymerized monomer. The styrene polymer which is obtained in the form of beads of good color is refined by collecting on a filter and washing by suspension in 4 volumes of ice water. The temperature of the water is raised to room temperature by allowing the suspension to stand and finally brought up to about 75°–80° C. by heating on a steam bath. Polystyrene is filtered, the refining procedure is repeated twice and the final polymer is then dried at 85°–90° C. in a vacuum oven for 48 hours. The extensive refining process is necessary for substantial removal of all occluded polyvinyl alcohol from the polystyrene.

The polymer obtained by the process described above is calculated to have a Staudinger molecular weight of 78,000, and moldings made therefrom are clear and of good color.

If polystyrene is prepared in accordance with the general process of Example 1 but without any enolic compound, the polymeric product is normally highly discolored and it has a Staudinger molecular weight of around 37,000.

It will be noted that in the above example the weight ratio of $$\frac{\text{Organic compound}}{\text{Catalyst}}$$

is 0.15. While this ratio is admirably suited for the particular reaction conditions of Example 1, the invention is not in any sense limited thereto as will be seen from the general discussion which follows Example 2.

Example 2

100 parts of ethyl acrylate
25 parts of a 10% aqueous solution of "Aquarex D"[1]
0.025 part of potassium persulfate (0.1% aqueous solution)
0.005 part of phenol
150 parts of distilled water

[1] Aquarex D consists of the sodium salts of sulfate monoesters of a mixture of higher fatty alcohols, chiefly lauryl and myristyl derivatives, and is neutral in reaction.

The phenol is mixed with the ethyl acrylate and this mixture, along with the other ingredients mentioned above, is placed in a vessel equipped with a reflux condenser and means for agitation. The reaction mixture is heated by steam with stirring. Polymerization starts in 5–8 minutes and is complete in about 15 minutes. After 30 minutes, the reaction mixture is steamed to remove all volatile material and then filtered, cooled and coagulated with methanol. The coagulated polymer is washed free of the emulsifying agent and dried in an air oven at 100° C. for 16 hours.

Example 2 is repeated using varying quantities of phenol and suitable amounts of various other compounds in place of the phenol. The results obtained, including those of Example 2 for the sake of completeness, are summarized in the table.

Table

| $\overset{\diagdown}{\diagup}C=C\overset{\diagup}{\diagdown}_{XH}$ Compound | | Time flow of 1% solution of polymer in toluene | Staudinger Molecular Weight of Polymer | Relative Viscosity | Intrinsic Viscosity |
|---|---|---|---|---|---|
| Type | Parts | | | | |
| phenol | 0.005 | 20 min. 25 sec. | 725,000 | 22.0 | 3.09 |
| Do | 0.01 | 26 min. 23 sec. | 945,000 | 28.4 | 3.34 |
| Do | 0.015 | 29 min. 51 sec. | 1,060,000 | 31.7 | 3.45 |
| Do | 0.03 | 33 min. 10 sec. | 1,197,000 | 35.7 | 3.57 |
| Do | 0.05 | 34 min. 59 sec. | 1,260,000 | 37.6 | 3.62 |
| Do | 0.1 | 33 min. 21 sec. | 1,200,000 | 35.9 | 3.58 |
| thiophenol | 0.02 | 30 min. 22 sec. | | 32.6 | 3.48 |
| p-brom-phenol | 0.02 | 41 min. 48 sec. | | 45.0 | 3.80 |
| β-naphthol | 0.03 | 36 min. 43 sec. | | 39.5 | 3.67 |
| thio-β-naphthol | 0.03 | 29 min. 49 sec. | | 32.1 | 3.46 |
| diethylmalonate | 0.02 | 26 min. 35 sec. | 952,000 | 28.6 | 3.35 |
| dibenzoylmethane | 0.02 | 10 min. 14 sec. | 345,000 | 11.0 | 2.40 |
| ethyl benzoylacetate | 0.02 | 33 min. 15 sec. | 1,200,000 | 35.8 | 3.57 |

In order to facilitate evaluation of the results summarized in the table, it should be noted that if ethyl acrylate is polymerized according to the procedure of Example 2 but without any enolic compound present, the time flow of a 1% solution of the polymer in toluene is about 2 min. 30 sec. and its Staudinger molecular weight is in the neighborhood of 60,000.

It will be apparent that polymerized ethyl acrylate of modified physical properties may be obtained according to the process of the present invention using 0.025% catalyst, based on the weight of monomeric ethyl acrylate, and from 0.005 to 0.1% of organic compound, also based on the weight of monomeric ethyl acrylate. The weight ratio of $$\frac{\text{Organic compound}}{\text{Catalyst}}$$

therefore, ranges correspondingly from 0.2 to 4.0. Since it is impractical to have to use much more organic compound than catalyst, I prefer working in a weight ratio range of from 0.8 to 1.2 but obviously my invention is not limited to this preferred embodiment.

The modifying effects of the organic compounds in the process of the present invention are only obtainable if polymerization is carried out in a non-acidic aqueous medium. Thus, the monomeric materials containing a single polymerizable $CH_2=C<$ group may be polymerized in neutral or alkaline aqueous dispersions or emulsions.

In the former case, suitable dispersing agents which may be used include talc, calcium phosphate, styrene-maleic acid heteropolymers, dimethyl styrene-maleic acid heteropolymers, methyl cellulose, methyl starch, glycol cellulose, gums, polyacrylamide, etc.

In the latter case it must be borne in mind that since the aqueous medium must be neutral or alkaline, cationic emulsifying agents are unsuitable. Neutral or anionic emulsifiers which may be used include, for example, sodium hydroxystearate, the sodium salts of long-chain sulfated alcohols such as sodium lauryl sulfate, the sodium salts of organic sulfonates including the sodium salts of alkyl substituted naphthalene sulfonic acids, the sodium salts of the alkyl esters of sulfosuccinic acid such as the sodium salt of the dioctyl ester of sulfosuccinic acid, etc. Mixtures of the various emulsifying agents may be used if desired.

Monomeric substances containing a single polymerizable $CH_2=C<$ group which may be polymerized according to the process of the present invention to produce a soluble thermoplastic polymer of modified physical properties include, in addition to the styrene and ethyl acrylate of the specific examples, monoalkyl substituted styrenes such as the ortho-, meta- and para-methyl styrenes, the ortho-, meta- and para-ethyl styrenes, the ortho-, meta-, and para-propyl styrenes, etc. The alkyl substituent may contain, in general, from 1 to 6 carbon atoms. Monohalogenated styrenes such as the ortho-, meta- and para-chlorostyrenes, the ortho-, meta- and para-bromstyrenes, etc., may also be used.

Other alkyl esters of acrylic acid having from 1 to 6 carbon atoms in the alkyl group such as methyl acrylate, propyl acrylate, isobutyl acrylate, hexyl acrylate, etc., fall within the scope of the present invention as do the corresponding alkyl esters of methacrylic acid and other alkacrylic acids having from 1 to 6 carbon atoms in the alkyl group of the ester portion of the compound and from 1 to 3 carbon atoms in the alkyl group of the acid portion of the molecule, acrylic acid itself, methacrylic acid and ethacrylic acid, acrylonitrile, acrylamide, methylol acrylamide, methylol methacrylamide, methacrylamide, N-alkyl acrylamides, di-N-alkyl acrylamides, vinyl esters such as vinyl chloride, vinyl acetate, etc.

Mixtures containing two, three, eight, eleven or an infinite number of monomeric substances, each containing only a single polymerizable $CH_2=C<$ group, may be polymerized according to the process of the present invention which is therefore applicable to the improvement of physical properties of such useful copolymers as those of acrylamide and acrylic acid esters, of acrylonitrile and acrylic acid esters, of styrene and acrylonitrile, of styrene, acrylonitrile and acrylate, etc.

Those organic compounds containing a single grouping

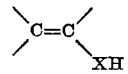

where X is O or S which are stable in neutral and alkaline media are generally suitable for use as modifying compounds in the process of the present invention. Examples of such compounds include phenol and thiophenol, alpha- and beta-naphthols and thionaphthols, ortho-, meta- and para-aminophenols, halogenated phenols and naphthols such as brom-, chlor- and iodo-phenols and naphthols, etc. It is interesting to note that of the di- or poly-substituted aromatic compounds, those possessing a meta substitution are by far the most effective.

The invention is not limited to the use of any particular peroxide catalyst and those which are suitable include inorganic peroxides such as hydrogen peroxide, alkali metal persulfates, percarbonates, perborates, etc., as potassium persulfate, sodium percarbonate, potassium perborate, etc. These catalysts are water-soluble and may suitably be incorporated in the aqueous phase of the polymerizable emulsions or dispersions. Organic peroxides suitable for use which include benzoyl peroxide, benzoyl acetic peroxide, lauroyl peroxide, oleic peroxide, stearic peroxide, acetic peroxide, etc., are preferably incorporated in the non-aqueous phase. Mixtures of two or more, up to and including an infinite number of catalysts may be used, certain combinations of catalysts favoring particular physical forms of polymers.

Relatively small proportions of polymerization catalysts are used and, in general, from 0.01% to 5% thereof, based on the weight of polymerizable material, may be used to increase the rate of polymerization of the monomer and, in conjunction with the proper amounts of organic compound, to produce a desired property modification in accordance with the present invention. I find, however, that from 0.02%–2% catalyst is generally sufficient and this constitutes the preferred amount although the invention is not limited thereto.

The particular amount of organic compound used according to the process of the present invention is largely dependent upon the amount of peroxide catalyst present and upon the nature of monomeric substance to be polymerized. In the polymerization of ethyl acrylate, for example, it has been demonstrated that a preferred combination consists of about 0.025% catalyst and 0.02% organic compound in which case the ratio of organic compound to catalyst is 0.8. Similarly, it has been demonstrated that excellent results can be obtained in the polymerization of styrene if 0.15% catalyst and 0.0225% organic compound are used, the ratio of organic compound to catalyst being 0.15. In general, the ratio of $$\frac{\text{Organic compound}}{\text{Catalyst}}$$

may range from about 0.1 to about 4.0. I prefer, largely for practical reasons, to operate within the weight ratio range of 0.1 to 1.5 regardless of the particular monomeric compound which it is desired to polymerize.

The thermoplastic polymers prepared according to the process of the present invention are soluble in organic solvents and possess unique properties, largely occasioned by the increased molecular weights, which render them admirably suited for many applications.

The time of flow of a 1% solution in toluene of the polymers of the specific examples is determined by dissolving 1 gram of the dry polymer in 100 cc. of toluene at 25° C. 10 cc. of this solution are then placed in a viscosimeter tube #100 and its time of flow determined at 25° C.

From the time flow figure, the relative viscosity may be obtained. It is equal to $$\frac{\text{Time of flow of the resin solution in toluene}}{\text{Time of flow of toluene itself}}$$

From the relative viscosity, the intrinsic viscosity which is equal to $$\frac{\log_e \eta_r}{c}$$

where $\eta_r$ is the relative viscosity and $c$ is the concentration in grams per 100 cc. of solvent may be calculated.

The Staudinger molecular weight is calculated in the usual manner, making use of the equation:

$$\frac{\eta_{sp}}{c} = K_m M$$

where $\eta_{sp}$ is the specific viscosity, $c$ is the concentration, $K_m$ is a characteristic constant, and M is the molecular weight.

I claim:

A process for modifying the physical properties of a homopolymer of ethyl acrylate which comprises polymerizing monomeric ethyl acrylate in a non-acidic aqueous emulsion in the presence of from 0.005% to 0.1% by weight of phenol as the sole modifying agent and 0.025% by weight of peroxide polymerization catalyst, whereby a homopolymer of ethyl acrylate of greatly increased molecular weight is obtained.

EDWARD L. KROPA.

REFERENCES CITED

The following references are of record in the file of this patent:

UNITED STATES PATENTS

| Number | Name | Date |
|---|---|---|
| 2,121,839 | Strain | June 28, 1938 |
| 2,140,048 | Fikentscher et al. | Dec. 13, 1938 |
| 2,255,483 | D'Alelio | Sept. 9, 1941 |
| 2,346,107 | Johnson | Apr. 4, 1944 |
| 2,380,474 | Stewart | July 31, 1945 |
| 2,396,997 | Fryling | Mar. 19, 1946 |